United States Patent [19]

Nojiri et al.

[11] 4,438,422

[45] Mar. 20, 1984

[54] WARNING METHOD AND SYSTEM FOR VEHICLES

[75] Inventors: Tadao Nojiri, Oobu; Kenji Kanemaru, Chiryu; Takayoshi Nishikawa, Kariya; Masahiro Matsuyama, Kariya; Yoji Ito, Kariya, all of Japan

[73] Assignee: Nippondenso Co., Ltd., Kariya, Japan

[21] Appl. No.: 296,253

[22] Filed: Aug. 26, 1981

[30] Foreign Application Priority Data

Sep. 5, 1980 [JP] Japan ................... 55-123821

[51] Int. Cl.³ .................. B60Q 5/00; G08B 21/00
[52] U.S. Cl. .................... 340/52 F; 340/692
[58] Field of Search ........... 340/52 F, 692, 815.21, 340/815.22

[56] References Cited

U.S. PATENT DOCUMENTS

| 3,870,818 | 3/1975 | Barton et al. | 340/692 |
| 4,342,023 | 7/1982 | Tsunoda et al. | 340/692 |
| 4,348,653 | 9/1982 | Tsuzuki et al. | 340/52 F |

*Primary Examiner*—Glen R. Swann, III
*Attorney, Agent, or Firm*—Cushman, Darby & Cushman

[57] ABSTRACT

A warning system for vehicles monitors malfunctions in various items of a vehicle which are to be detected, such as, the failure of the tail lamps, headlamps, etc., whereby when a malfunction is detected in any one of the items, a visual indication corresponding to the malfunction of the item is given inside the vehicle compartment and then the indicated malfunction is indicated by voice inside the vehicle compartment when it is determined that a predetermined time has expired from the time of beginning the visual indication. The magnitude of the voice is controlled by the ambient sound level detected in the vehicle compartment.

7 Claims, 7 Drawing Figures

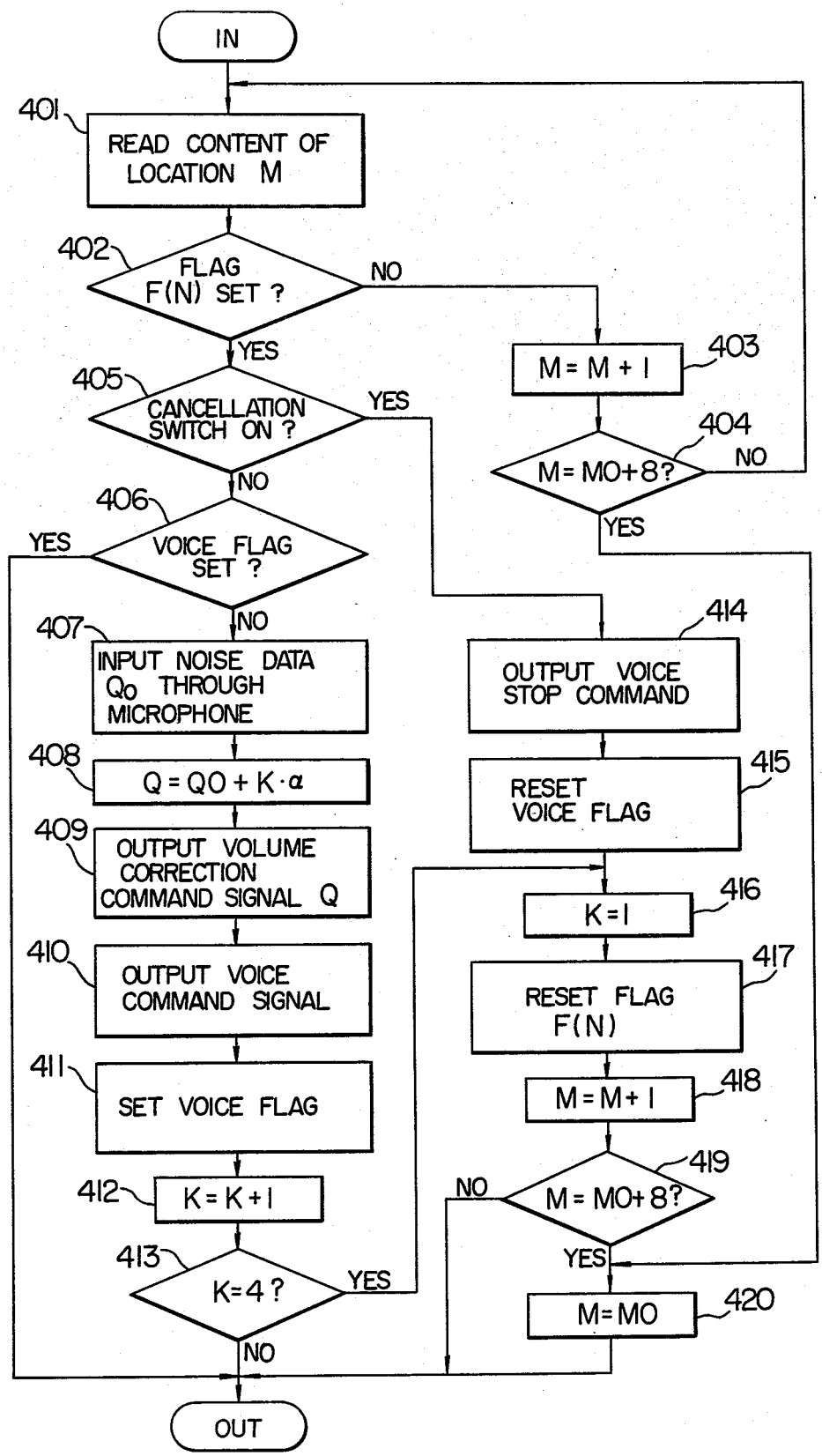

WARNING METHOD AND SYSTEM FOR VEHICLES

BACKGROUND OF THE INVENTION

The present invention relates to a warning method and system for vehicles which are designed so that when a malfunction or irregularity is detected in at least one of various itmes of a vehicle which are to be detected, a warning of the malfunction is given inside the vehicle compartment first by the display and then by the voice generation.

In the past, a warning system known as the OK Monitor has been installed on some vehicles and this system monitors the conditions of various items of the vehicle which are to be detected so that if the condition of at least one of the items to be detected becomes faulty, this faulty condition is indicated inside the vehicle compartment.

The recent trend with the OK Monitor has been toward giving a warning of such malfunction inside the vehicle compartment by means of the voice generation. However, this system is disadvantageous in that if the generation of a voice takes place without any previous announcement such as display, the driver, etc., will tend to be disturbed mentally.

SUMMARY OF THE INVENTION

With a view to overcoming the foregoing deficiency in the prior art, it is an object of the present invention to provide a warning method for vehicles which is so designed that when any one of the various items to be detected becomes faulty, this faulty condition is first indicated by display on the inside of the vehicle compartment of an automobile and upon determination that a predetermined time has elapsed from the time of beginning the indication a warning of the faulty condition is given by the generation of a voice inside the vehicle compartment, thus giving a warning of any malfunction by voice with a reduced mental disturbance on the part of the driver, etc.

It is another object of the present invention to provide a system capable of satisfactorily performing such warning method.

Thus, the present invention has among it great advantages the fact that when the condition of any one of various items of a vehicle to be detected becomes faulty, the fault condition is first displayed on the inside of the vehicle compartment and upon determination that a predetermined time has expired after the time of beginning of the display the fault condition is warned by the generation of a voice inside the vehicle compartment, thus ensuring that the generation of a voice takes place after the step of displaying the occurrence of a fault condition and a warning of the fault condition is given properly with reduced mental disturbance on the part of the driver, etc., as compared with the previously known methods in which the generation of a voice takes place immediately after the occurrence of a malfunction in any one of the items to be detected.

Another great advantage is that the abovementioned warning method for vehicles can be satisfactorily preformed through the generation of a display command signal and a voice command signal in accordance with the processing of the signals from a plurality of sensors.

BRIEF DESCRIPTION OF THE DRAWINGS

FIG. 5 is a computing flow chart showing the detailed computing steps of the malfunction warning operational routine shown in FIG. 3.

DESCRIPTION OF THE PREFERRED EMBODIMENT

The present invention will now be described in greater detail with reference to the illustrated embodiment.

Figure 1:
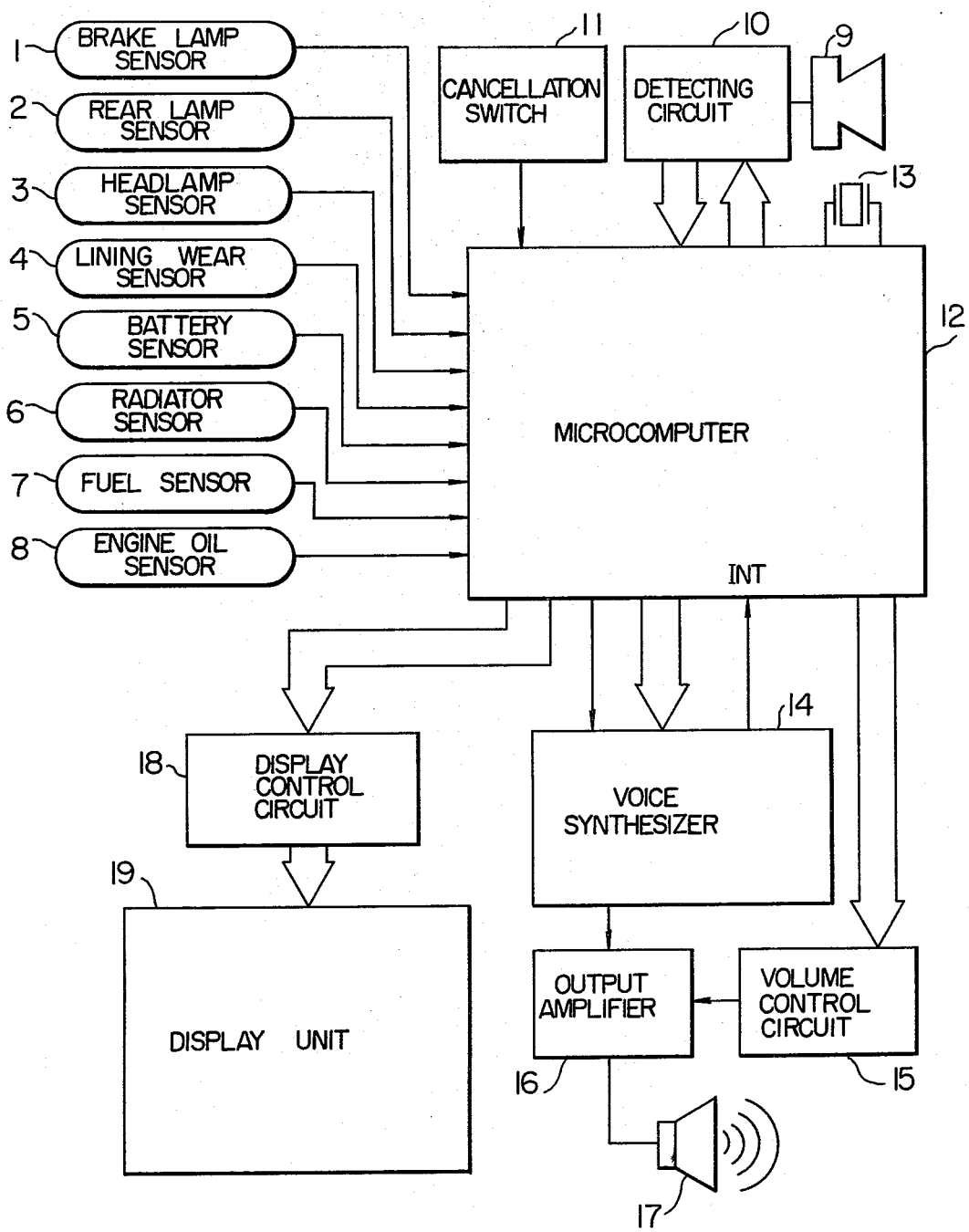
FIG. 1 is a block diagram showing the overall construction of an embodiment of the present invention.

FIG. 1 is a block diagram showing the overall construction of an embodiment of the present invention. In the Figure, numeral 1 designates a brake lamp sensor for sensing the failure of brake lamps, 2 a rear lamp sensor for sensing the failure of rear lamps (tail lamps and a license lamp), 3 a head-lamp sensor for sensing the failure of head-lamps, 4 a brake lining wear sensor for sensing that the thickness of a worn-out lining is less than a predetermined level, 5 a battery fluid sensor for sensing that the amount of battery fluid is less than a predetermined lever, 6 a radiator coolant sensor for sensing that the liquid level in a radiator reserve tank is less than a predetermined level, 7 a fuel sensor for sensing that the remaining fuel quantity is less than predetermined level, and 8 an engine oil sensor for sensing that the engine oil quantity is below a predetermined level. Each of the sensors generates a signal of a two-valued level, one level representing a normal condition and the other level representing an abnormal condition or malfunction. Numeral 9 designates a microphone for detecting the presence of ambient noise such as the noise within the vehicle compartment. Numeral 10 designates a detecting circuit comprising an amplifier circuit, a smoothing circuit, an A/D converter, etc., for amplifying the detection signal from the microphone 9, smoothing the amplified signal and generating an analog ambient sound signal corresponding to the average ambient sound intensity. Numeral 11 designates a cancellation switch which is closed when the generation of voice is to be stopped and which is installed at a position that permits an easy operation by the driver. The horn switch on the steering wheel may for example be used as the cancellation switch 11 by suitably controlling the timing of its operation.

Numeral 12 designates a microcomputer forming control means for performing the digital computing operations in accordance with a predetermined control program. The microcomputer 12 is connected to a crystal unit 13 of several MHz and it is operable in response to the application of a stabilized voltage of 5 V from a stabilized power supply circuit (not shown) which is operated by the power supplied from the vehicle battery. The microcomputer 12 operates in such a manner that in response to the detectin signals from the sensors 1 to 8, the ambient sound signal from the detecting circuit 10, the signal from the cancellation switch 11 and the signals from various other sensors which are not shown, the required computing operations are performed, thus generating a display command signal for displaying a malfunction and then a voice command signal for generating a malfunction indicative voice.

The microcomputer 12 comprises as its principal component parts a read-only memory (ROM) storing a control program which determines the computing procedure, a central processing unit (CPU) for successively reading the control program in the ROM to perform the corresponding computing operations, a memory (RAM) for temporarily storing the various data relating to the computing operations of the CPU so as to be read out by the CPU, a clock generator including the crystal unit 13 for generating the required reference clock pulses for the various computing operations and an input/output (I/O) circuit section for controlling the input and output operations of the various signals.

Numeral 14 desginates a voice synthesizer with a voice data ROM having preliminarily stored in the predetermined areas the voice data for generating the desired voices, whereby when the voice command signal from the microcompute 12 or the first location signal indicative of the first location in the predetermined area of the voice data ROM is received, starting at the first location, the contents of the locations in the predetermined area are successively subjected to voice synthesis to generate a voice signal. The PARCOR system is used for this voice synthesis and the voice synthesizing operation is stopped when a voice stop signal is received from the microcomputer 12 in the course of the operation. When the voice synthesizing operation is completed, the voice synthesizer 14 sends an interruption signal to the interruption (INT) terminal of the microcomputer 12.

Numeral 15 designates a volume control circuit for holding the volume command signal from the microcomputer 12 to generate a volume control signal corresponding to the volume command signal. Numeral 16 designates an output amplifier whereby the voice signal from the voice synthesizer 14 is amplified and the voice is generated by a speaker 17. The amplifier 16 also performs the volume control with the amplification factor corresponding to the volume control signal from the volume control circuit 15. The voice synthesizer 14, the output amplifier 16 and the speaker 17 form voice generating means.

Figure 2A:
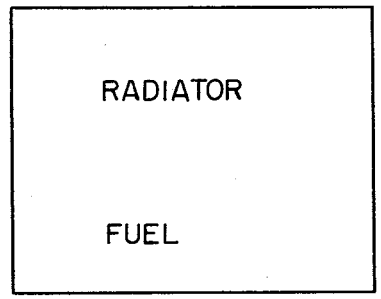
FIGS. 2a and 2b are diagrams showing various forms of the display provided by a display unit.
Figure 2B:
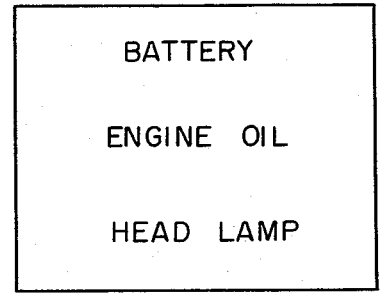

Numeral 18 designates a display control circuit for holding the display command signal from the microcomputer 12 and generating a display signal corresponding to the kind and the number of the display command signal which is being held. Numeral 19 designates a display unit of the liquid crystal type which is responsive to the display signal from the display control circuit 18 to give a mulfunction display as shown in FIG. 2a or FIG. 2b. The display control circuit 18 and the display unit 19 form display means.

With the constructions described above, the operation of the embodiment will now be described with reference to the computing flow charts of FIGS. 3 to 6.

Now, in the vehicle equipped with the system of FIG. 1, when the key switch is closed to start the operation of the vehicle, the power is supplied from the vehicle battery through the key switch and the electric component parts are brought into operation.

Figure 3:
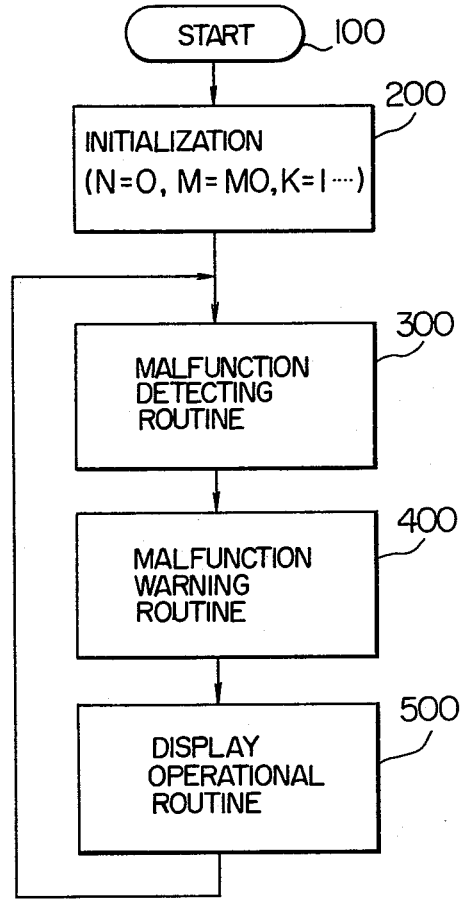
FIG. 3 is a computing flow chart showing the overall computing operation of the microcomputer shown in FIG. 1.

When the microcomputer 12 comes into operation, the control is transferred from a start step 100 to an initialization step 200 in FIG. 3, so that the registers, counters, latches, etc., in the microcomputer 12 are set to the required initial values for starting the computing operations. The setting operations of this initialization step include the setting of number of times or frequency data N and K to N=0 and K=1 and location data M to M=M0 and the resetting of flags F(0) to F(7) and a voice flag as will be described later.

Then, the control is transferred to a malfunction detecting operational routine 300 so that in accordance with the signals from the respective sensors 1 to 8, it is determined whether there is a malfunction in any of the items to be detected. If it is, a display command signal corresponding to the malfunctioning item is generated and after the expiration of a predetermined time from the time of generation of the signal the computing operation is performed to set the flag corresponding to the malfunctioning item. Then, the control is transferred to a malfunction warning operational routine 400. The malfunction warning operational routine 400 is such that when the malfunction detecting operational routine 300 sets the flag, the computing operations are performed to generate a voice indicative of the malfunctioning item corresponding to the flag, and then the control is transferred to a display operational routine 500. Although the associated sensors and display circuits are not shown, the display operational routine 500 performs the necessary computing operations for displaying the distance traveled, the fuel consumption, the remaining fuel quantity, etc., and then the control is returned to the malfunction detecting operational routine 300. The computational processing of the main routine including the malfunction detecting operational routine 300 through the display operational routine 500 is repeated at intervals of several hundreds m sec.

Figure 4:
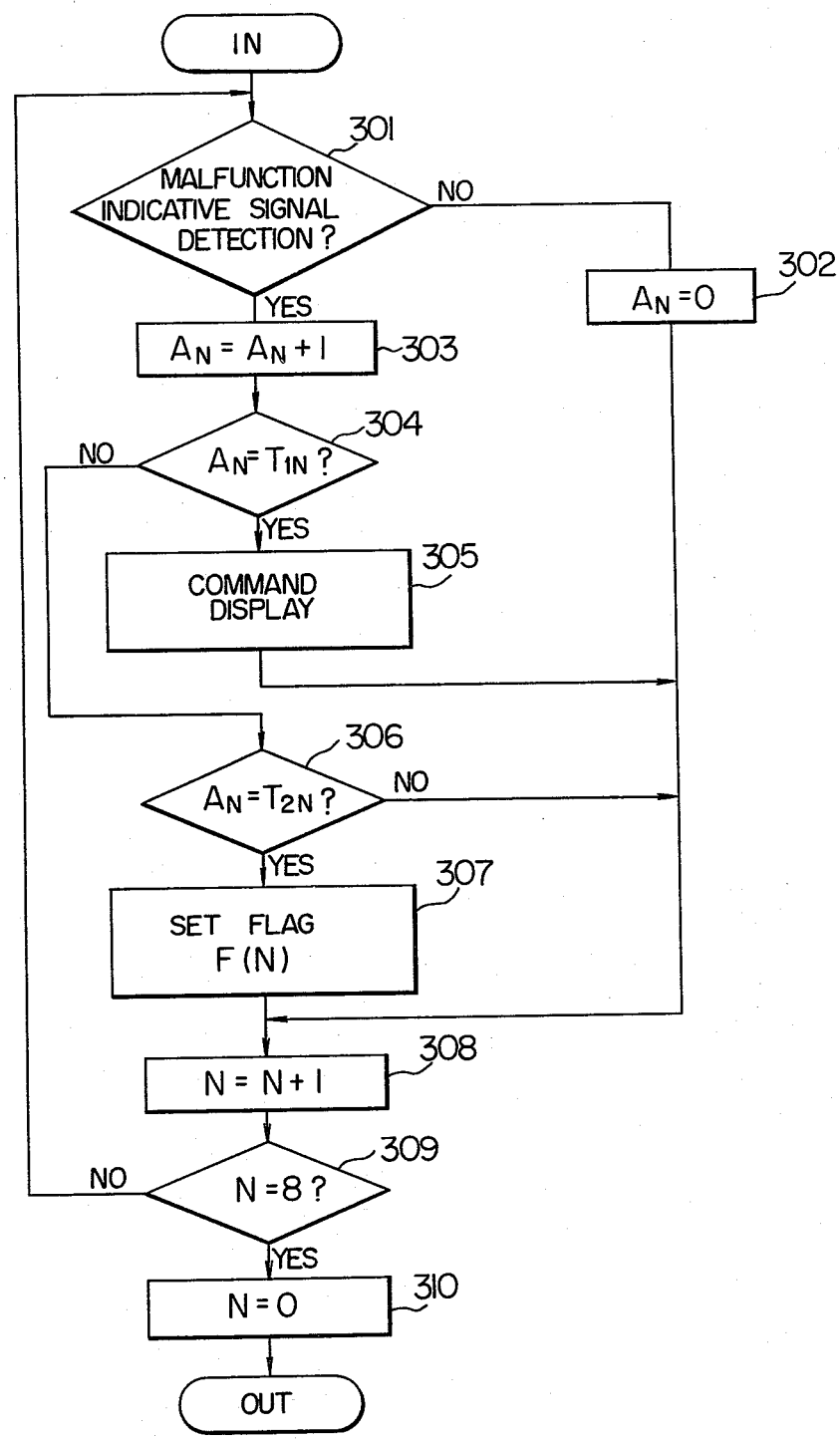
FIG. 4 is the detailed computing steps of the malfunction detecting operational routine shown in FIG. 3.

The detailed computing operations of the malfunction detecting operational routine 300 are shown in FIG. 4. In the malfunction detecting operational routine 300, the detection of a malfunction according to the detection signal from the sensors 1 to 8, respectively, correspond to 0 to 7 of the frequency data N. More specifically, when the frequency data N is 0, the detection of brake lamp failure is performed in accordance with the detection signal from the brake lamp sensor 1, and when the frequency data N is 1, the detection of rear lamp failure is performed in accordance with the detection signal from the rear lamp sensor 2. In this way, when the frequency data N is 7, the detection of engine oil level drop is performed in response to the signal from the engine oil sensor 8. When the control first arrives at the malfunction detecting operational routine 300, the frequency data N has been set to 0 by the initialization step. As a result, when the control arrive first at a signal malfunction decision step 301 of the malfunction detecting operational routine 300, it is determined whether the detection signal from the brake lamp sensor 1 is a signal of the malfunction indicative level indicating the brake lamp failure. If it is not, the decision results in "NO" and the control is transferred to a timer reset step 302. The timer reset step 302 resets a timer data $A_0$ to 0. (The timer data $A_0$ is set in correspondence to N=0 and timer data $A_1$ to $A_7$ are respectively set in correspondence to N=1 to 7.) Then, the control is transferred to an addition step 308 so that the frequency data N is updated by adding a constant of 1 to it (N=N+1=1). Then, the control is transferred to a frequency decision step 309 and its decision results in "NO" since the frequency data N is now 1, thus returning the control to the signal malfunction decision step 301. When all of the detection signals from the rear lamp sensor 2 to the engine oil sensor 8 are at the normal condition indicative level, the computational processing proceeding from the signal malfunction decision step 301 through the timer reset step 302, the addition step 308 and the frequency decision step 309 and returning to the signal malfunction decision step 301 is performed repeatedly, so that when the frequency data N updated by the additional step 308 becomes 8, the control is transferred to the next frequency decision 310 and thus the frequency data N is reset to 0, thus completing one cycle of the computational processing of the malfunction detecting operational routine 300. At this time, the flags F(0) to F(7) have been reset by the initialization and remain so. The flags F(0) to F(7) will respectively be set in consecutive locations M0 to M0+7.

After the malfunction detecting operational routine 300 has been completed, the control is transferred to the malfunction warning operational routine 400. The malfunction warning operational routine 400 is such that its computational processing is started by a read step 401 of FIG. 5 and the content of the location M or the location M0 set by the initialization, etc., is read out. Then, the control is tansferred to a flag F(N) decision step 402 which in turn determines whether the flag F(0) has been set in the location M(0). Since it is not, the decision of the decision step 402 results in "NO". Then, the control is trasnferred to an addition step 403 so that the location data M is updated by increasing it by 1 (M=M+1=M0+1) and the control is tansferred to a location decision step 404. Since the location data M is M0+1, the decision of the step 404 results in "NO" and the control is returned to the read step 401. In the like manner, whether each of the flags F(1) to F(7) has been set is determined in accordance with the content of the locations M0+1 to M0+7, respectively. Since none of these flags has been set, the computational processing proceeding from the read step 401 through the flag F(N) decision step 402, the addition step 403 and the location decision step 404 and returning to the read step 401 is performed repeatedly until the address data M updated by the addition step 403 becomes M0+8. When this occurs, the decision of the next location decision step 404 results in "YES" so that the control is transferred to an address setting step 420 and the location data M is set to M0, thus completing one cycle of the computational processing of the malfunction warning operational routine 400. Then, the control is returned to the malfunction detecting operational routine 300 through the display operational routine 500. Thereafter, the computational processing proceeding from the malfunction detecting operational routine 300 to the display operational routine 500 is repeatedly performed and no malfunction display and no voice generation for the respective items to be detected are effected.

Assume now that the failure of the headlamp occurs so that the headlamp sensor 3 generates a signal of the malfunction indicative level. As a result, in the malfunction detecting operational routine 300 the frequency data N now becomes N=2. Thus, when the control arrives at the signal malfunction decision step 301, its decision results in "YES" since the malfunction indicative level signal is being generated from the headlamp sensor 3. Thus, the control is transferred to an addition step 303 so that the timer data $A_2$ is increased by 1 ($A_2 = A_2 + 1 = 0 + 1 = 1$) and updated. Then, the control is transferred to a first timer decision step 304 which in turn determines whether a first preset data $T_{12}$ (preset data $T_{10}$ to $T_{15}$ each has a repetitive computation frequency value of about 3 seconds and preset data $T_{16}$ and $T_{17}$ each has a repetitive computation frequency value of about 15 seconds) has been reached. Since the addition operation on the timer data $A_2$ has just begun, the decision of the step 304 results in "NO" and the control is transferred to a second timer decision step 306 which in turn determines whether the timer data $A_2$ has reached a second preset data $T_{22}$ (preset data $T_{20}$ to $T_{25}$ each has a repetitive computation frequency value of about 6 seconds and each of preset data $T_{26}$ and $T_{27}$ has a repetitive computation frequency value of about 18 seconds). The decision of the steps 306 results in "NO" and the control is trasnferred to an addition step 308. Thereafter, each time the control is transferred to the malfunction detecting operational routine 300, the timer data $A_2$ is increased and updated.

Then, when the time of about 3 seconds expires and the timer data $A_2$ increased and updated by the addition step 303 reaches the value of $T_{12}$ (Namely, the detection is not erroneous), the decision of the next first timer decision step 304 resuls in "YES". Then, the control is transferred to a display command step 305 so that the display control circuit 18 receives a display command signal corresponding to the frequency data N=2 and the control is transferred to the addition step 308. As a result, the display control circuit 18 supplies a display signal corresponding to the display command signal to the display unit 19 causing it to give a display of "HEADLAMP".

Then, when another 3 seconds or so expires after the display has begun (namely, at the expiration of about 6 seconds since the beginning of the addition operation on the timer data $A_2$) and the timer data $A_2$ which was increased and updated by the addition step 303 reaches the value of $T_{22}$, the control is transferred through the first timer decision step 304 to the second timer decision step 306 whose decision now results in "YES". Then, the control is trasnferred to the flag F(N) setting step 307 so that the flag F(2) is set in the location M0+2 and the control is transferred to the addition step 308. As a result, when the content of the location M0+2 is read out by the read step 401 of the malfunction warning operational routine 400, the decision of the next flag F(N) decision step 402 results in "YES" since the flag F(2) has been set. Then, the control is transferred to a cancellation switch decision step 405 which in turn determines whether the cancellation switch 11 has generated a cancellation signal to cancel the voice generation. If there has been no voice generation and no cancellation signal has been generated from the cancellation swtich 11, the decision of the step 405 results in "NO". Then, the control is transferred to the next voice flag decision step 406 and its decision results in "NO" since the voice flag has been reset by the initialization. Thus, the control is transferred to the next microphone input step 407 which in turn inputs as a noise data Q0 the signal which was obtained by means of the microphone 9 and the detecting circuit 10 and indicative of the magnitude of the average noise within the vehicle compartment, and the control is transferred to an addition step 408. The step 408 computes a correction data Q to correct the volume to a value which is greater than the noise by a predetermined value $\alpha$ as $Q = Q0 + K \cdot \alpha = Q0 + \alpha$ (the initialization has set $K=1$) and then the control is transferred to a volume correction command step 409 which in turn applies a volume correction command signal indicative of the correction data Q to the volume control circuit 15. Then, the control is transferred to a voice command step 410 so that the voice command signal determined by the flag F(2) or the first location signal indicative of the first location of the desired area in the voice data ROM is applied to the voice synthesizer 14 and the control is trasnferred to a voice flag setting step 411. The step 411 sets the voice flag and the control is transferred to an addition step 412. The step 412 increases and updates the frequency data K to (K=K+1=1+1=2), and the control is then transferred to a frequency decision step 413. Since the frequency data K is now 2, the decision of the step 413 results in "NO" and one cycle of the computational processing of the malfunction warning operational routine 400 is completed. As a result, in response to the first location signal from the microcomputer 12 the voice synthesizer 14 starts to successively synthesize the desired voice and generates the voice of "HEADLAMP HAS BECOME FAULTY" through the output amplifier 16 and the speaker 17. The volume of this voice is made slightly greater than the ambient noise inside the vehicle compartment through the adjustment of the amplification factor of the output amplifier 16 by the volume control circuit 15.

Thereafter, when the control arrives at the read step 401 of the malfunction warning operational routine 400 so that the flag F(2) is read from the location M0+2, the control is transferred to the voice flag decision step 406 through the flag F(N) decision step 402 and the cancellation switch decision step 405. Since the voice flag has been set by the voice flag decision step 411, the decision of the step 406 results in "YES" and one cycle of the malfunction warning operational routine 400 is completed. Thereafter, the similar computing operations as described above are performed each time the control is transferred to the malfunction warning operational routine 400.

Figure 6:
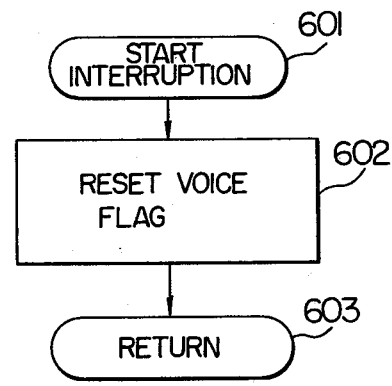
FIG. 6 is a flow chart of an interruption operation performed in response to an interruption signal from a voice synthesizer.

When the voice synthesizer 14 completes the synthesis of voice so that an interruption signal is applied to the terminal INT of the microcomputer 12, the microcomputer 12 temporarily interrupts the computational processing of the main routine and performs the interrupt computational processing of FIG. 6. In other words, the interrupt computational processing is started by an interrupt start step 601 and the control is transferred to a voice flag reset step 602. Thus, the voice flag is reset and the control is transferred to a return step 603 and the control is returned to the processing of the previously interrupted main routine.

As a result of the resetting of the voice flag by the interrupt computational processing, when the control is transferred to the voice flag decision step 406 of the malfunction warning operational routine 400, its decision results in "NO" so that the control is transferred to the microphone input step 407 and the noise data Q0 is inputted. Then, the control is transferred to the addition step 408 and the computation of correction data Q0 (Q0=Q0=2a) is performed. The control is then transferred to the volume correction command step 409 thus applying to the volume control circuit 15 a volume correction command signal corresponding to the correction data Q0, and then the control is trasnferred to the voice command step 410 which in turn applies a voice command signal to the voice synthesizer 14. Then, the control is transferred to the voice flag setting step 411 thus setting the voice flag and the control is further transferred to the addition step 413 thus increasing and updating the frequency data K (K=K+1=2+1=3). Then, the control is transferred to the frequency decision step 413 and its decision results in "NO" since the frequency data K is 3, thus completing one cycle of the malfunction warning operational routine 400. As a result, the voice synthesizer 14 again begins to synthesize the voice and the voice of "HEADLAMP HAS BECOME FAULTY" is generated through the output amplifier 16 and the speaker 17. The volume of this voice is increased over the first voice through the adjustment of the amplification factor of the output amplifier 16 by the volume control circuit 15 and this increased volume makes it easier for the driver to recognize the warning of the malfunction.

In the course of the voice generation, if the driver closes the cancellation switch 11 to stop the voice generation, the cancellation switch 11 generates a cancellation signal. As a result, when the control is transferred to the cancellation switch decision step 405 of the malfunction warning operational routine 400, its decision results in "YES". Then, the control is transferred to a voice stop command step 414 and a voice stop command signal for stopping the voice synthesis is applied to the voice synthesizer 14. The control is transferred further such that a voice flag reset step 415 resets the voice flag and a frequency reset step 416 resets the frequency data to 1. The control is further transferred such that a flag F(N) reset step 417 resets the flag F(2) in the location M0+2 and an addition step 418 increases and updates the location date M (M=M0+2+1=M0+3). Then, the control is transferred to a location decision step 419 so that its decision results in "NO" since the location data M is M0+3, and one cycle of the computational processing of the malfunction warning operational routine 400 is completed. As a result, the voice synthesizer 14 stops the voice synthesis in the middle and the generation of the voice from the speaker 17 is stopped.

Where the cancellation switch 11 is not closed, when the frequency data increased and updated by the addition step 412 becomes 4, the processing proceeds such that the decision of the next frequency decision step 413 results in "YES" and the control is transferred to the frequency reset step 416, thus stopping the generation of teh voice "HEADLAMP HAS BECOME FAULTY" after the voice has been generated three times. (The volume is increased with every voice generation.)

While the foregoing description has been made in connection with the headlamp failure, the similar malfunction display and voice generation will be accomplished in the case of brake lamp failure, rear lamp failure, brake lining wear, low battery fluid level, low radiator coolant level, low fuel level and low engine oil level. In the event that a malfunction occurs in each of the two or more items, the malfunction will be displayed as shown in FIG. 2a or 2b and then the voices for the malfunctions will be successively generated.

While, in the embodiment described above, the display unit 19 of the liquid crystal type is used for malfunction displaying purposes, it is possible to provide an indicator for each of the items to be detected such that the indicator or indicators associated with the malfunctioning item or items are turned on or alternatively the plurality of indicators may be replaced with a single malfunction indicator to give only an indication of malfunction (namely, the location of any malfunction is not indicated). Also, the operation of the plurality of indicators or the malfunction indicator may be detected by a light sensor so that the time of detection is used as the time for starting the indication of the malfunctions.

Further, while the plurality of sensors 1 to 8 are used, it is possible to use other sensors such as a cooling water temperature sensor for sensing the engine cooling water temperature and an air pressure sensor for sensing the tire pressure.

Further, while the time interval between the display of a malfunction and the generation of a voice is selected about 3 seconds, the time interval may be varied in response to an external setting operation and also the time interval may be calculated by the counting of an external timer. Further, while the maximum frequency of voice generation is selected 3, the maximum frequency may be varied in response to an external setting operation.

Still further, while the microcomputer 12 is used for the control means, control means comprising electronic circuitry of the hard logic design may also be used.

Stil further, while the voice generating means comprising the voice synthesizer 14, the output amplifier 16 and the speaker 17 is used, it is possible to use for example a magnetic tape having recorded therein those words which are to be reproduced as voices.

We claim:

1. A warning method for vehicles comprising the steps of:
    detecting the condition of each of a plurality of items of a vehicle which are to be monitored;
    displaying, inside a vehicle compartment of said vehicle, a faulty condition when a faulty condition of at least one of said items is detected by said detecting step;
    measuring the lapse of time after the display of said faulty condition is initiated by said displaying step; and
    generating a voice to give a warning of said faulty condition inside said vehicle compartment when the lapse of time measured by said measuring step exceeds a predetermined time.

2. A warning system for vehicles comprising:
    a plurality of sensors each thereof being adapted to monitor the condition of one of a plurality of items of a vehicle which are to be monitored;
    control means responsive to fault signals from said plurality of sensors whereby, when it is determined that the condition of at least one of said items to be detected is faulty, a display command signal corresponding to said faulty item is generated and then a voice command signal corresponding to said faulty item is generated when it is determined that a predetermined time has expired from the time of generation of said display command singal;
    display means responsive to said display command signal from said control means to display said faulty item inside a vehicle compartment; and
    voice generating means responsive to said voice command signal from said control means to generate a voice indicative of said faulty item within said vehicle compartment.

3. A warning system for vehicles comprising:
    a plurality of sensors each thereof being adapted to monitor the condition of one of a plurality of items of a vehicle which are be monitored;
    a microcomputer responsive to fault signals from said plurality of sensors to check for any malfunctions in said items to be monitored by programmed computing operations whereby, when the condition of at least one of said items to be detected is faulty, a display command signal corresponding to said faulty item is generated and then a voice command signal corresponding to said faulty item is generated when it is determined that a predetermined time has expired from the time of generation of said display command singal;
    display means responsive to said display command signal from a microcomputer to display said faulty item; and
    voice generating means responsive to said voice command signal from said microcomputer to generate a voice indicative of said faulty item.

4. A system according to claim 3, wherein said display means comprises a display control circuit for holding said display command signal and generating a display signal corresponding to a kind and a number of said display command signal, and a display unit responsive to said display signal to give a display.

5. A system according to claim 3, wherein said voice gnerating means comprises a voice synthesizer responsive to said voice command signal from said microcomputer to synthesize a voice and generate a voice signal, and a speaker responsive to said voice signal to generate said voice.

6. A system according to claim 3, further comprising a cancellation switch for stopping the generation of voice, whereby when said cancellation switch is closed, said microcomputer detects the same and applies a voice stop command signal to said voice generating means to stop the voice generation thereof.

7. A warning sytem for vehicle comprising:
    a plurality of sensors each thereof being adapted to detect respective faulty conditions of a vehicle which are preselected to be detected:
    display means for displaying in a vehicle compartment at least one of said faulty conditions detected by said sensors;
    timer means for measuring the lapse of time after the initiation of the faulty condition display by said display means;
    voice generator means for generating in the vehicle compartment a voiced warning indicative of the faulty condition being displayed by said display means when the lapse of time measured by said timer means exceeds a predetermined time;
    a microphone for detecting an ambient sound level in the vehicle compartment; and
    control means for controlling the magnitude of said voiced warning of said voice generator means in accordance with said ambient sound level detected by said microphone.

* * * * *